United States Patent [19]

Hebert et al.

[11] 4,023,893
[45] May 17, 1977

[54] LAMP AND LENS RETROFIT ASSEMBLY FOR OVERHEAD PROJECTOR

[75] Inventors: Roger T. Hebert, Peabody; John A. Pappas, Winthrop; Richard J. Shea, Hathorne, all of Mass.

[73] Assignee: GTE Sylvania Incorporated, Salem, Mass.

[22] Filed: June 28, 1976

[21] Appl. No.: 700,656

[52] U.S. Cl. .................. 353/100; 240/2 AT; 240/41 BM; 240/153; 352/198; 353/102; 353/DIG. 6

[51] Int. Cl.² .................. G03B 21/14; G03B 21/20; F21V 33/00

[58] Field of Search ............ 353/DIG. 6, 85, 100, 353/101, 102; 240/2 AT, 37, 41 BM, 153; 352/198, 203

[56] References Cited

UNITED STATES PATENTS

| 2,004,200 | 6/1935 | Goodlin et al. | 240/41 BM |
| 2,033,619 | 3/1936 | Foster et al. | 353/102 |
| 2,469,491 | 5/1949 | Bailey | 240/37 |
| 2,534,042 | 12/1950 | Love | 240/37 |
| 3,023,667 | 3/1962 | Lessman | 353/85 |
| 3,269,259 | 8/1966 | Russell | 353/45 |
| 3,963,916 | 6/1976 | Morton | 240/41 BM |

FOREIGN PATENTS OR APPLICATIONS

| 2,413,111 | 10/1975 | Germany | 353/102 |

Primary Examiner—Steven L. Stephan
Attorney, Agent, or Firm—Edward J. Coleman

[57] ABSTRACT

A retrofit assembly for replacing a lens-containing lamp in an overhead projector. The assembly comprises a quartz-halogen lamp, having an internal reflector and an enlarged base removably mounted in the projector, and a lens holding bracket removably mounted in the projector in alignment with the lamp. The bracket is resiliently pivoted toward the lamp and has a tab for striking the lamp base to retain the lens at a predetermined distance from the lamp.

7 Claims, 5 Drawing Figures

LAMP AND LENS RETROFIT ASSEMBLY FOR OVERHEAD PROJECTOR

BACKGROUND OF THE INVENTION

This invention relates to projector lamp assemblies and, more particularly, to lamp and lens arrangements for overhead projectors.

Certain commercially available overhead projectors have used an incandescent projection lamp having a soft glass envelope containing both an internal reflector and an internal condenser lens. A notable disadvantage of such a lamp is the significant reduction in light output over the life of the lamp due to the deposition of tungsten (from the filament) on the plano surface of the internal lens. In addition, the build-up of tungsten deposit on the lens causes internal heating which can eventually result in cracking of the lens and failure of the lamp.

A means for overcoming such problems was required. Since hundreds of thousands of the projectors were in the field, it was desirable that a retrofit assembly be provided which could be installed with relative ease and be compatible optically with the replaced system. By using the word "retrofit" herein, we refer to its meaning as commonly understood in the art, viz., to modify or replace a portion of original equipment to thereby correct the equipment, bring it up to new specifications, or the like. Generally, this modification or replacement takes place sometime after the original equipment has been issued for use or placed on the market.

SUMMARY OF THE INVENTION

In view of the foregoing, it is an object of the present invention to provide a retrofit assembly for an overhead projector which is relatively easy to install and optically compatible with the replaced system.

It is a further object to provide an improved lamp assembly for an overhead projector which may readily be installed as a retrofit.

These and other objects, advantages and features are attained, in accordance with the invention, by replacing the lens-containing reflector-lamp in an overhead projector with a retrofit assembly comprising: a lamp having a base removably mounted in the projector; a lens holding bracket means removably mounted in the projector and positioned with the lens thereof in close proximity to and in alignment with the lamp; resilient pivoting means for the bracket so that the lens may be swung away from the lamp to facilitate removal or replacement of the lamp, the bracket normally being urged toward the lamp; and, a tab extending from the bracket for striking the base of the lamp when the bracket is in its normal position to thereby retain the lens at a predetermined distance from the lamp.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
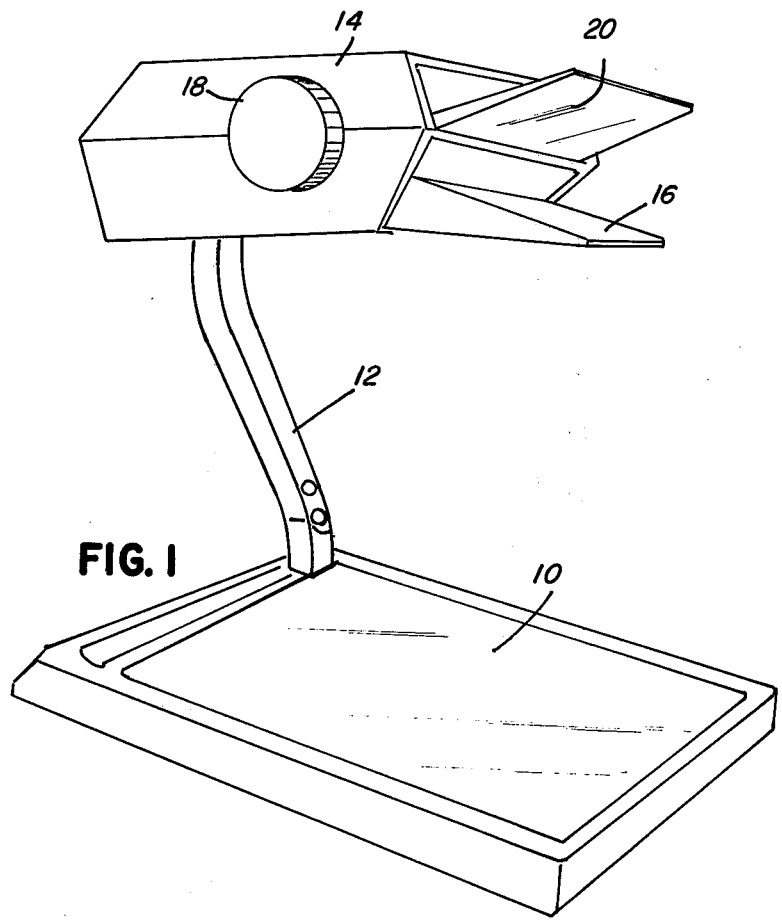
FIG. 1 is a perspective view of the overhead projector.

FIG. 1 illustrates an overhead projector of the type in which a retrofit assembly according to the invention is incorporated. The unit comprises a viewing platform 10 having an upstanding arm 12 supporting a projection head 14. Attached to the projector head is viewing lens 16 adjustable by knob 18, and a mirror 20. The power cord is not shown.

Figure 2:
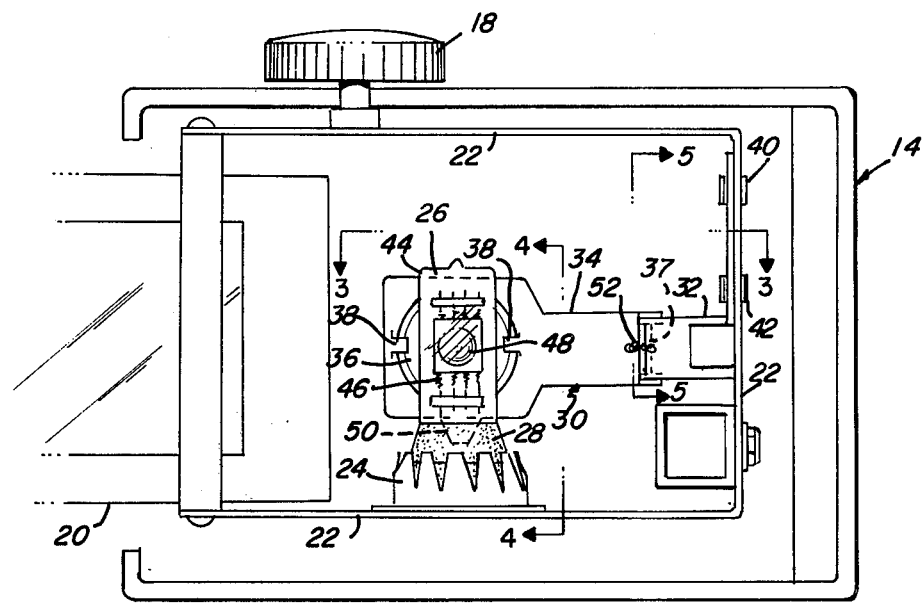
FIG. 2 is a top view of the projector of FIG. 1 with the cover removed so as to show a retrofit assembly according to the invention.

FIG. 2 shows the interior of head 14, as viewed from the top with the cover removed. The projector light source is mounted within this head on a U-shaped support chassis 22. A lamp socket 24 mounted on support 22 is the same as that used with the prior lens containing lamp that is being replaced.

Figure 3:
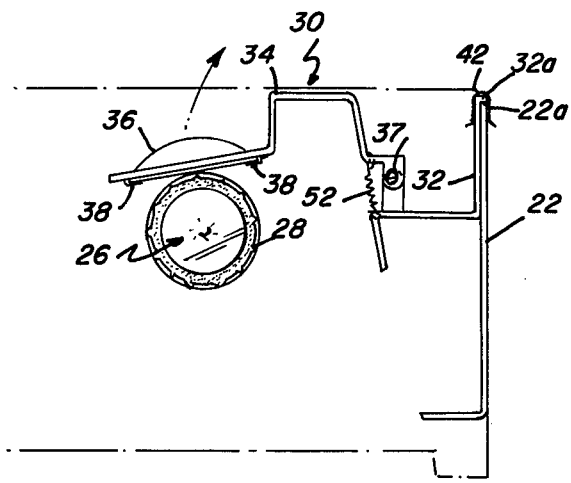
FIG. 3 is a fragmentary detail as viewed from line 3—3 of FIG. 2.

Referring also to FIG. 3, the retrofit assembly according to the invention comprises a quartz-halogen lamp 26 having an insulating base 28 removably mounted in the socket 24. Also mounted on support 22, and disposed between lamp 26 and viewing platform 10, is a lens holding bracket means 30. In this particular embodiment, the bracket means 30 comprises two components, a mounting portion 32 removably attached to support 22, and a lens holding portion 34 pivotally connected by a hinge pin 37 to the mounting portion 32. Portion 34 holds a condenser lens 36 by means of tabs 38.

Figure 5:
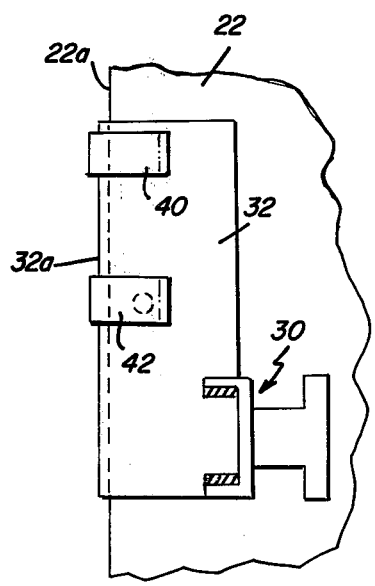
FIG. 5 is a fragmentary detail as viewed from line 5—5 of FIG. 2.

Referring to FIGS. 3 and 5, the mounting portion 32 of bracket means 30 has a wide depending tab 32a received by a periphery 22a of support 22. Removable spring clips 40 and 42 engage both the bracket mounting portion 32 and support chassis 22 to retain the bracket in its mounted position. Hence, upon merely engaging tab 32a against the support periphery 22a and snapping on the spring clips, the bracket means 30 is automatically positioned with the lens 36 in alignment with lamp 26. Of course, in lieu of a wide tab 32a, the bracket positioning means may comprise two or more narrow tabs adapted to be received by corresponding holes or slots in support 22. That is, in lieu of an edge 22a, the periphery for receiving a tab may comprise a slot or hole.

Lamp 26 may be similar to that described in U.S. Pat. No. 3,555,338, except that in the present instance the base 28 is generally cylindrical rather than rectangular or oblong. Briefly, referring to FIG. 4, the lamp includes a quartz envelope 44 press sealed according to conventional techniques at the lower end and containing a halogen. A support structure electrically connected to base terminal pins (not shown) extends from the press seal and supports within the envelope a tungsten filament 46 and an internal reflector 48 disposed behind the filament.

Figure 4:
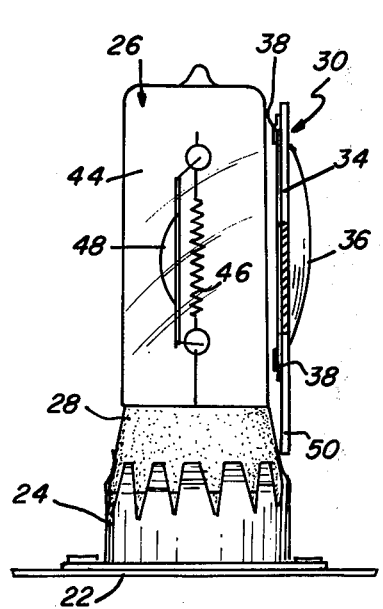
FIG. 4 is a fragmentary detail as viewed from line 4—4 of FIG. 2.

Referring to FIGS. 2 and 4, the lens holding portion 34 of bracket means 30 has a tab 50 extending therefrom for striking the lamp base 28, as shown, when portion 34 is moved toward lamp 26. In cooperation with this feature, a coiled tension spring 52 is connected between the lens holding portion 34 and the pivotally connected mounting portion 32 of bracket 30 to resiliently urge the lens 36 toward the lamp 26. For example, each end of spring 52 may be hooked into respective bracket holes as illustrated. Accordingly, when the resiliently urged (spring-loaded) bracket means is in its normal position, tab 50 strikes base 28 to automatically retain the lens at a predetermined distance from the lamp. In the illustrated embodiment, the lamp envelope is generally tubular and the lamp base 28 is generally cylindrical, with the diameter of the base being larger than that of the lamp. Hence, when tab 50 is in contact with base 28, a predetermined spacing is maintained between the lens 36 and lamp envelope 44. Such a spacing, typically a small fraction of an inch (e.g., 0.02 inch) is particularly desirable since contact between the lens and envelope can result in damage due to heat and/or vibration.

In view of the requirement of very close proximity between the lens and lamp, the above-described resilient pivoting feature is particularly useful for enabling the lens to be swung away from the lamp to facilitate removal or replacement of the lamp. The overall combination of tabs 50 and 32a, resilient pivoting, and snap-on spring clips enables the assembly to be rapidly installed with relative ease so as to position lens 36 in close proximity to the lamp envelope and in alignment with the lamp filament.

In summary, a retrofit assembly has been provided which enables use of a quartz-halogen lamp (with its smaller size and stronger envelope) having an internal reflector in combination with a condenser lens mounted external to the lamp. The design of the lens holder is compatible with the projector head and allows for an extremely simple mode of installation, which can be effected by the projector owner in the field. The same package can also be readily installed in new units at the factory assembly line.

In addition to elimination of the metal deposit on the plano surface of the lens, the retrofit assembly provides other advantages. Consistent with quartz-halogen lamp technology, improved screen performance can be realized, since the design temperature of the filament can be increased while still maintaining an equivalency in lamp life performance. Or conversely, lamp life can be extended by as much as 25–30 percent, maintaining an equivalency in screen performance. Another economical cost advantage is inherent in the lower cost of the quartz-halogen lamp compared to the prior lens-containing reflector-lamp. Oncce the initial investment in the retrofit package (lens holder and mounting bracket) has been incurred, replacement lamp costs are reduced by as much as 20–25 percent.

Although the invention has been described with respect to specific embodiments, it will be appreciated that modifications and changes may be made by those skilled in the art without departing from the true spirit and scope of the invention. For example, the lens holding bracket means may comprise a one-peice bracket, rather than a pair of connected bracket portions, and other means may be employed for enabling resilient pivoting of the bracket.

What we claim is:

1. A retrofit assembly in combination with an overhead projector having a light source support means with a lamp socket mounted thereon, said retrofit assembly comprising:
   a lamp having a base removably mounted in said socket on said support means;
   a lens holding bracket means removably mounted on said support means and positioned with the lens thereof in close proximity to and in alignment with said lamp;
   resilient pivoting means for said lens holding bracket means whereby the lens thereof may be swung away from said lamp to facilitate removal or replacement of the lamp, said bracket means normally being urged toward said lamp by said resilient pivoting means; and
   a first tab extending from said lens holding bracket means for striking the base of said lamp when said resiliently urged bracket means is in its normal position, thereby retaining said lens at a predetermined distance from said lamp.

2. The assembly of claim 1 wherein said lamp includes an envelope secured to said base, a filament supported within said envelope, and a reflector disposed behind said filament within said envelope, said lens located outside of said envelope being positioned in alignment with said filament.

3. The assembly of claim 2 wherein the envelope of said lamp is quartz, said filament is tungsten, and said envelope contains halogen.

4. The assembly of claim 1 wherein said lamp envelope is generally tubular, and said lamp base is generally cylindrical, the diameter of said base being larger than the diameter of said lamp so that when the first tab of said bracket means is in contact with said base, a predetermined spacing is maintained between said lens and said envelope.

5. The assembly of claim 1 wherein sid lens holding bracket means further includes a second tab depending therefrom, and said support means defines a periphery for receiving said second tab, said second tab being operative to engage said periphery when said bracket means is mounted on said support member to thereby position said lens with respect to said lamp.

6. The assembly of claim 5 further including a removable spring clip engaging both said bracket means and said support means to thereby retain said bracket means in its mounted position.

7. The assembly of claim 6 wherein said bracket means includes a mounting portion and a lens holding portion; said first tab extends from said lens holding portion; said second tab depends from said mounting portion; said clip engages said mounting portion; and said resilient pivoting means comprises a hinge pin pivotally connecting said lens holding portion to said mounting portion, and a tension spring connected between said lens holding portion and said mounting portion.

* * * * *